Aug. 5, 1969  G. HOY  3,459,451

SEMI-TRAILER VEHICLES

Filed Oct. 13, 1966  3 Sheets-Sheet 1

Inventor
GORDON HOY
By
Attorney

Aug. 5, 1969  G. HOY  3,459,451
SEMI-TRAILER VEHICLES
Filed Oct. 13, 1966  3 Sheets-Sheet 2

Inventor
GORDON HOY
By

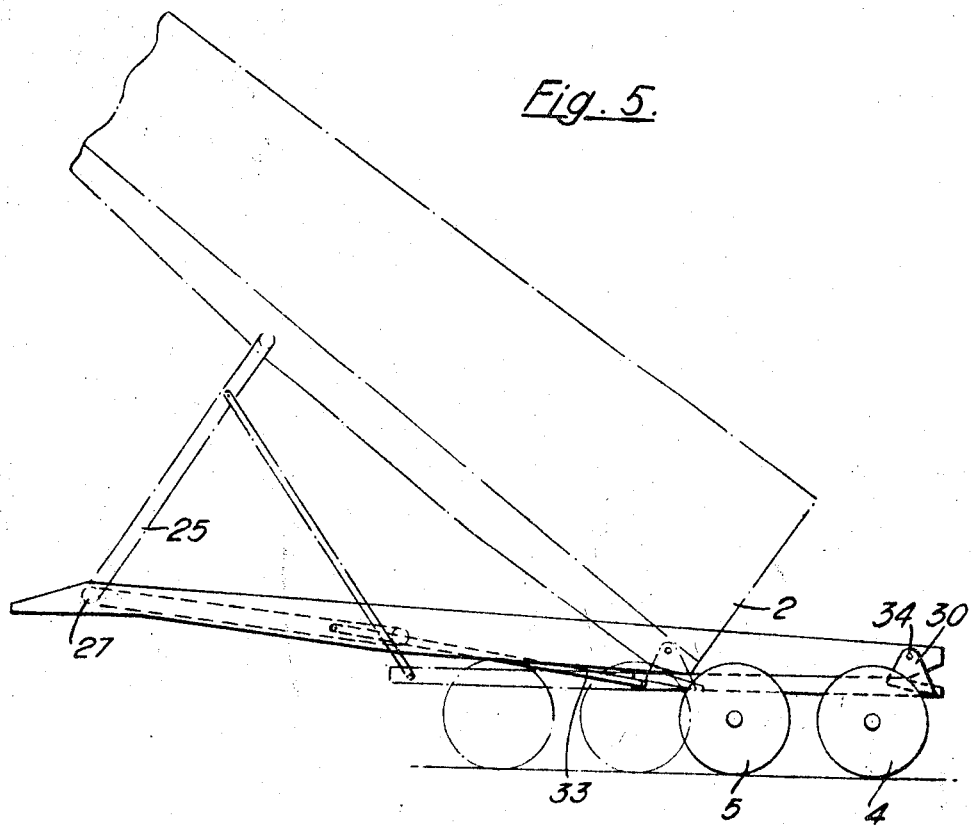

United States Patent Office 3,459,451
Patented Aug. 5, 1969

3,459,451
SEMI-TRAILER VEHICLES
Gordon Hoy, Danbury, Chelmsford, Essex, England, assignor to Hoynor Limited, Essex, England, a corporation of Great Britain
Filed Oct. 13, 1966, Ser. No. 586,551
Claims priority, application Great Britain, May 19, 1966, 22,394/66
Int. Cl. B60p *1/16, 1/28*
U.S. Cl. 298—22                                    5 Claims

ABSTRACT OF THE DISCLOSURE

This invention relates to semi-trailer vehicles of the type comprising a tractor vehicle having a fifth wheel coupling connection and a trailer having rear road wheels and at its front end a fifth wheel coupling plate for engagement on the fifth wheel connection of the tractor vehicle. This invention relates particularly to trailers for use in such vehicles.

---

The main object of the present invention is to provide an improved trailer for inclusion in a semi-trailer vehicle of the aforesaid type.

According to the present invention, a load transporting vehicle adapted for towing by a power-driven tractor equipped with a fifth wheel coupling comprises a sub-structure incorporating a fifth wheel coupling plate and a mounting for at least one pair of rear road wheels, a load carrying body mounted on the sub-structure so that it can be pivoted about its rear portion by raising its forward portion, two or more co-acting members, each connected at one end to the sub-structure, the other ends of the members being arranged to provide a support for the tipped body solely at the bottom thereof and a fluid actuated device associated with at least one of the members and operable to tip the body about its rear portion.

In one preferred construction, three co-acting members are employed and two of said members each comprise a strut framework, said two members being pivotally connected to the sub-structure and to the vehicle body in such a manner that the two members form a parallel linkage.

The rear road wheel mounting may comprise a sub-frame to the rear portion of which the tipping body is pivoted, one of the co-acting members being pivoted at its ends respectively to the sub-structure and to the tipping body, another co-acting member being connected at its ends respectively to the front portion of the sub-frame and to the first-named member between the two ends of the latter, the arrangement being such that the second named member acts, in the raised position of the body, so as to resist upward movement of the front portion of the sub-frame.

In the last named construction, the first-named member may comprise two parallel elements, each connected at their ends respectively to the under-side of the tipping body and to the sub-structure, the said elements being spaced apart by substantially the width of the sub-frame and each being pivotally connected to the sub-frame by a further element, the further elements being parallel and constituting the second-named member.

The co-acting member associated with the fluid actuated device is preferably rigidly connected to the sub-structure and pivotally connected to the bottom of the front portion of the tipping body, whereby the said member can be operated to raise the front end of the body about its rear portion.

In order that the invention may be more fully understood, some embodiments in accordance therewith will now be described, by way of example, with reference to the accompanying drawings, in which:

FIG. 5 is a line diagram showing the relative positions of the components of the vehicle of FIGS. 3 and 4 and the connections between them.

Figure 1:
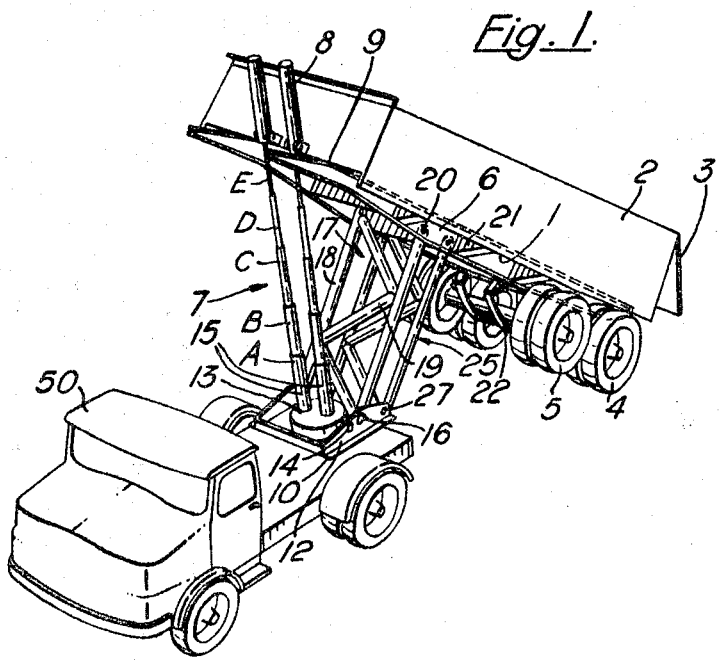
FIG. 1 is a side elevation showing a vehicle with the trailer in the tipped position.
Figure 2:
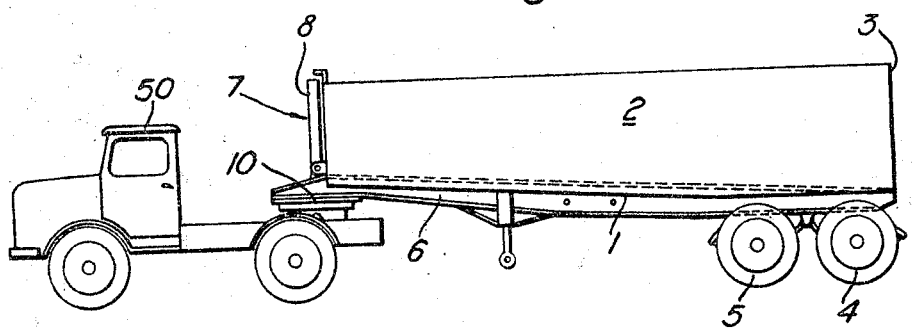
FIG. 2 is a side elevation of FIG. 1 with the trailer in the load carrying travelling position.

Referring first to the FIGS. 1 and 2, the tractor unit 50 is a conventional power-driven vehicle having on its rear portion above the rear road wheel axle a trailer fifth wheel coupling connection of conventional construction which requires no further description here since it forms no part of the present invention.

The trailer of the present invention comprises a sub-structure which includes an under frame 1 supporting a load carrying body 2 which is preferably provided with a swinging rear door 3, the rear end of the under frame 1 in this embodiment constituting a mounting for a pair of rear double road wheels 4, one on each side of the vehicle. The road wheels 4 may, as shown, be augmented by a second pair of road wheels 5 disposed in front thereof. At least one pair of wheels, and preferably all the wheels, are provided with braking means with connections of conventional construction to the tractor unit. Two of the co-acting members in this embodiment are shown each as a strut framework, these framework being designated respectively 18 and 25, the lower ends of the framework being pivotally connected, as for example 25, 26, to the fifth wheel coupling plate and the other ends being connected to chassis member 6 attached to the under-frame 1 of the load carrying body 2, the relative disposition of the two frameworks being such that they form a parallel linkage.

Although the two framework construction above-described is preferable since it provides substantial stability against side tipping of the vehicle, it is possible to employ only a single framework constituting one of the links.

The fifth wheel plate 10, forming part of the trailer, is constructed of conventional shape for towing connection to the tractor unit coupling indicated at 11. The plate 10 has a pair of spaced brackets 12 extending fore and aft of the plate and to these brackets a transome 13 is secured by suitable means, such as bolts 14, the transome being supported on the plates 10 to support the load thereon when the vehicle is tipped, as will be explained.

Mounted on the transome 13 are the bottom portions of the forward co-acting member 7 formed as telescopic sections to which fluid under pressure may be applied to extend them to raise the forward portion of the body 2. Any convenient lifting device may be used, however, in association with the forward co-acting member 7. It will be understood that any suitable number of sections may be used, but in the drawing, five sections A, B, C, D and E are shown in telescoped one within the other, the top section 8 in the lowermost position telescoping over the section A as seen in FIGURE 2. The telescopic sections are hollow so that when hydraulic fluid, e.g. oil, is forced into them whilst in their lower position, the sections are caused to slide one through the other to extend the sections to the position shown in FIGURE 1. The hydraulic fluid is provided from a reservoir on the tractor unit by a pump operated from a prime mover on the tractor unit. Suitable oil pipe connections are provided, and when the tractor unit and trailer are coupled by the fifth-wheel coupling plate, these are joined up in a conventional way to couple the telescopic sections to the oil reservoir. For clarity the components of the hydraulic mechanism are omitted from the drawings.

It will be seen that, when the body is in the travelling position shown in FIGURE 2, with the front ends of the members 6 resting on the plates 10, operation of the telescopic sections to raise the front end of the trailer will cause the frames 18 and 25 to pivot upwardly to support the vehicle body in the tipped position, thus relieving the sections of a substantial part of the load. At the same time, the rear wheels 4 will be drawn forward, thereby moving the tipping body away from the load flowing out of the back thereof onto the ground, so that the load may be deposited without being hindered by the rear end of the trailer. A disadvantage present in many conventional tipping trucks is thus obviated.

The embodiment described has two pairs of double wheels supporting the rear end of the trailer, and it will be seen that the front pair 5 are raised off the ground during the tipping operation, thereby allowing the body to pivot about the axle carrying the rear road wheels 4. The wheels 5 are so mounted that, in the lowered position of the body, they fully engage the ground and share with the wheels 4 the load of the rear part of the vehicle through conventional springs 22.

Figure 3:
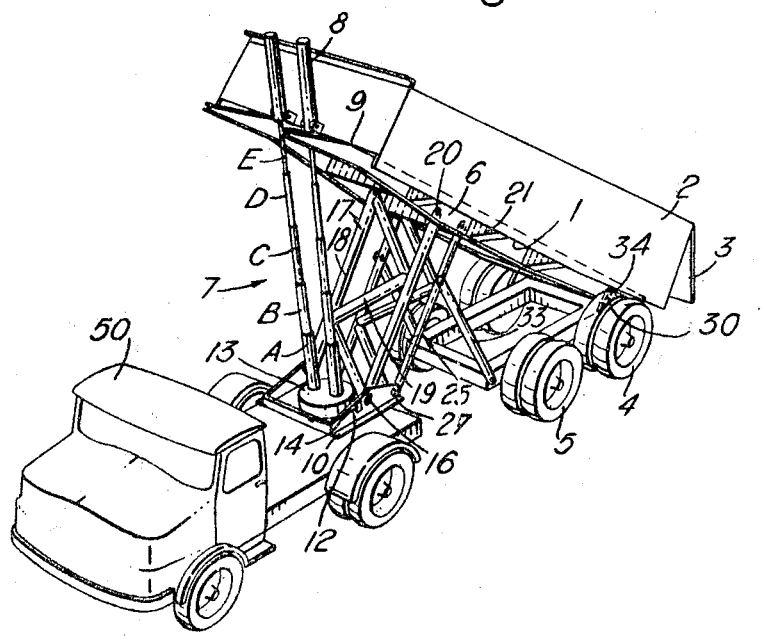
FIG. 3 is a perspective view showing another vehicle with the trailer in the tipped position.
Figure 4:
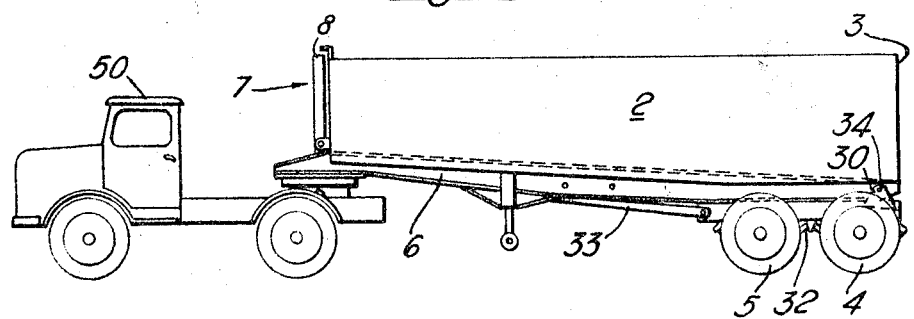
FIG. 4 is a side elevation with the vehicle of FIG. 3 with trailer in the load carrying travelling position.

An alternative embodiment is shown in FIGURES 3 to 5, being similar to the embodiment above-described except that the rear end of the chassis 1 is pivotally connected to brackets 30, one of which is secured to each side of the rear portion of a sub-frame 31 which supports the wheels 4 and 5 through a conventional springing arrangement, part of which is shown at 32. In this embodiment, two further co-acting members 33 are provided, connecting the front end of the sub-frame at each end to one of the struts 36 of the lower strut frame 25. The members 33, however, may be pivotally connected to either frames 18 or 25.

It will thus be seen that, when the body is in the travelling position shown in FIGURE 2 with the front end of the member 6 resting on the plates 10, admission of hydraulic fluid to the telescopic sections will extend them and thus raise the front end of the trailer, which will pivot about pivot pin 34 journalled in the brackets 30 on the rear of the sub-frame, the frames 18 and 25 pivoting upwardly and thus supporting the load of the vehicle and relieving the telescopic sections of a substantial part of that load. As the frames rise upwardly, a tensile force will be exerted along the members 33 having a component acting towards the front of the vehicle and urging sub-frame 31, together with the road wheels 4 and 5 forwardly. At the same time, the members 33 will prevent the front end of the sub-frame from rising and thus keeping all the wheels 4 and 5 on the ground. Again it will be seen that, as the tipping body is raised, it will be drawn forward away from the load flowing therefrom, providing the advantage described in connection with the embodiment of FIGURES 1 and 2.

The frames 18 and 25 are preferably made one narrower than the other so that, in the lower position of the tipping body, one of the frames lies within the other, and both lie along the longitudinal chassis members 6 to provide a compact construction. In the lowered position of the body 1, the members 33 are lowered into a position adjacent to the folded sub-frames as shown in FIGURE 2, and diagrammatically in FIGURE 3. Although in the constructions illustrated, the telescopic sections are separated from the frames 18 and 25, the sections may be incorporated in one or both of the frames, so that, for example, the sections form one or more tubular strut frame members. In such a construction, the second strut frame would be arranged to assume a convenient supporting position when the first frame is extended, and to fold away, parallel to the chassis members, for example when the first frame is lowered.

I claim:
1. A load transporting trailer comprising, in combination,
an elongate load-receiving body having front and rear ends and an underlying frame portion,
wheel means supporting the rear end of said body,
fluid operated means for raising and lowering the front end of said body,
a fifth wheel coupling assembly adapted to be connected to the fifth wheel of an associated towing vehicle,
first link means pivotally connected at its opposite ends to said fifth wheel coupling assembly and to said frame portion respectively,
second link means pivotally connected at its opposite ends to said fifth wheel coupling assembly and to said frame portion respectively, the axis of pivotal connection between said second link means and said fifth wheel coupling assembly and the axis of pivotal connection between said second link means and said frame portion being rearwardly displaced from the corresponding pivotal axes of connection between said first link means and said fifth wheel coupling assembly and said frame portion, whereby guided movement of said body during raising and lowering thereof is effected by said first and second link means independently of said fluid actuated means.

2. The trailer as defined in claim 1 wherein each said first and second link means comprises a pair of transversely spaced rigid links, and bracing rigidly interconnecting each such pair of links.

3. The trailer as defined in claim 1 wherein at least one of said first and second link means comprises a pair of rigid links disposed in transversely spaced relation to brace the trailer laterally.

4. The trailer as defined in claim 3 wherein said fluid actuated means is rigidly fixed at one end to said fifth wheel coupling assembly and is pivotally connected at its opposite end to said frame portion adjacent the front end of said body.

5. The trailer as defined in claim 3 wherein said fluid actuated means comprises a pair of transversely spaced piston and cylinder assemblies, each rigidly connected at its lower end to said fifth wheel coupling assembly and pivotally connected at its upper end to said frame portion adjacent the front end of said body.

References Cited

UNITED STATES PATENTS

| | | | |
|---|---|---|---|
| 2,861,837 | 11/1958 | Morse | 298—22 X |
| 3,055,710 | 9/1962 | Black | 298—22 |
| 3,094,351 | 6/1963 | Gwinn | 296—28 |
| 2,775,480 | 12/1956 | Braswell | 298—19 |
| 2,794,673 | 6/1957 | Harbers | 298—22 |
| 2,853,341 | 9/1958 | Morse | 298—20 |
| 2,953,410 | 9/1960 | Chaney | 298—20 X |
| 3,256,042 | 6/1966 | Hunsaker | 298—22 |
| 2,542,799 | 2/1951 | Day | 298—11 |

RICHARD J. JOHNSON, Primary Examiner